US010227861B2

(12) United States Patent
Wu et al.

(10) Patent No.: US 10,227,861 B2
(45) Date of Patent: Mar. 12, 2019

(54) CROSS-COUPLING BASED DETERMINATION OF ANISOTROPIC FORMATION PROPERTIES

(75) Inventors: Dagang Wu, Katy, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 131 days.

(21) Appl. No.: 14/234,621

(22) PCT Filed: Jul. 26, 2011

(86) PCT No.: PCT/US2011/045350
§ 371 (c)(1),
(2), (4) Date: Jan. 23, 2014

(87) PCT Pub. No.: WO2013/015789
PCT Pub. Date: Jan. 31, 2013

(65) Prior Publication Data
US 2014/0163887 A1 Jun. 12, 2014

(51) Int. Cl.
*G01V 3/28* (2006.01)
*E21B 47/022* (2012.01)

(52) U.S. Cl.
CPC .............. *E21B 47/022* (2013.01); *G01V 3/28* (2013.01)

(58) Field of Classification Search
CPC .................................................... E21B 47/022
USPC ............................................................ 702/7
See application file for complete search history.

(56) References Cited

U.S. PATENT DOCUMENTS

| 4,264,862 | A | 4/1981 | Koelle et al. |
| 6,044,327 | A | 3/2000 | Goldman |
| 6,393,364 | B1 * | 5/2002 | Gao ...................... E21B 47/026 |
| | | | 324/339 |
| 6,556,016 | B2 | 4/2003 | Gao et al. |

(Continued)

FOREIGN PATENT DOCUMENTS

| WO | 2013/015789 | 1/2013 |
| WO | WO-2013/015789 | 1/2013 |

OTHER PUBLICATIONS

PCT International Search Report and Written Opinion, dated Sep. 27, 2011, Appl No. PCT/US2011/45350, "Cross-Coupling Based Determination of Anisotropic Formation Properties", filed Jul. 26, 2011, 7 pgs.
Hou, Junsheng, et al., "Finite-difference simulation of borehole EM measurements in 3D anisotropic media using coupled scalar-vector potentials", Geophysics, vol. 71, No. 5 (Sep.-Oct. 2006) p. G225-G233, http://uts.cc.utexas.edu/~cefe/CFE%20PDFs/Hou_Mallan_TorresVerdin_Geophysics_2006.pdf.

(Continued)

*Primary Examiner* — Manuel L Barbee
*Assistant Examiner* — Raymond L Nimox
(74) *Attorney, Agent, or Firm* — Benjamin Fite; C. Tumey Law Group PLLC

(57) ABSTRACT

Tools, systems, and methods are disclosed for multi-component induction logging with iterative analytical conversion of tool measurements to formation parameters. At least some system embodiments include a logging tool and at least one processor. The logging tool provides transmitter-receiver coupling measurements that include at least diagonal coupling measurements (Hzz, Hxx, and/or Hyy) and cross-coupling measurements (Hxy, Hxz, and Hyz). The processor employs an iterative analytical conversion of the cross-coupling measurements into formation resistive anisotropy and dip information. The processor may further provide one or more logs of the resistive anisotropy and/or dip information.

8 Claims, 5 Drawing Sheets

(56) References Cited

U.S. PATENT DOCUMENTS

| | | | |
|---|---|---|---|
| 7,046,112 B2 | 5/2006 | Davies et al. | |
| 7,195,075 B2 | 3/2007 | San Martin et al. | |
| 7,505,851 B2 | 3/2009 | Bal et al. | |
| 7,579,841 B2 | 8/2009 | San Martin et al. | |
| 7,814,036 B2 | 10/2010 | Chen et al. | |
| 7,866,407 B2 | 1/2011 | San Martin et al. | |
| 7,888,941 B2 | 2/2011 | San Martin et al. | |
| 8,296,113 B2 | 10/2012 | San Martin | |
| 8,299,796 B2 | 10/2012 | San Martin et al. | |
| 2002/0173914 A1* | 11/2002 | Zhang | G01V 3/28 702/7 |
| 2003/0105591 A1* | 6/2003 | Hagiwara | G01V 3/28 702/7 |
| 2004/0100263 A1* | 5/2004 | Fanini | G01V 3/28 324/339 |
| 2004/0196047 A1 | 8/2004 | Fanini et al. | |
| 2005/0274512 A1* | 12/2005 | Tabarovsky | G01V 3/28 166/254.2 |
| 2008/0033654 A1* | 2/2008 | Bespalov | G01V 3/28 702/7 |
| 2009/0230968 A1* | 9/2009 | Bittar | G01V 3/28 324/338 |
| 2010/0230095 A1 | 9/2010 | Yin | |

OTHER PUBLICATIONS

Weiss, Chester J., et al., "Electromagnetic Induction in a fully 3-D anisotropic earth", Geophysics, vol. 67, No. 4 (Jul.-Aug. 2002), p. 1104-1114, http://geophysics.geoscienceworld.org/cgi/content/abstract/67/4/1104.

PCT International Preliminary Report on Patentability, dated May 23, 2013, Appl No. PCT/US2011/45350, "Cross-Coupling Based Determination of Anisotropic Formation Properties", filed Jul. 26, 2011, 8 pgs.

AU Patent Examination Report No. 1, dated May 23, 2014, Appl No. 2011373690, "Cross-Coupling Based Determination of Anisotropic Formation Properties", filed Jul. 26, 2011, 3 pgs.

AU Notice of Acceptance, dated Dec. 22, 2014, Appl No. 2011373690, "Cross-Coupling Based Determination of Anisotropic Formation Properties", filed Jul. 26, 2011, 2 pgs.

Hou, Junsheng, et al., "Finite-difference simulation of borehole EM measurements in 3D anisotropic media using coupled scalar-vector potentials", Geophysics, vol. 71, No. 5 (Sep.-Oct. 2006) p. G225-G233, http://uts.cc.utexas.edu/~cefe/CFE%20PDFs/Hou_Malian_TorresVerdin_Geophysics_2006.pdf.

* cited by examiner

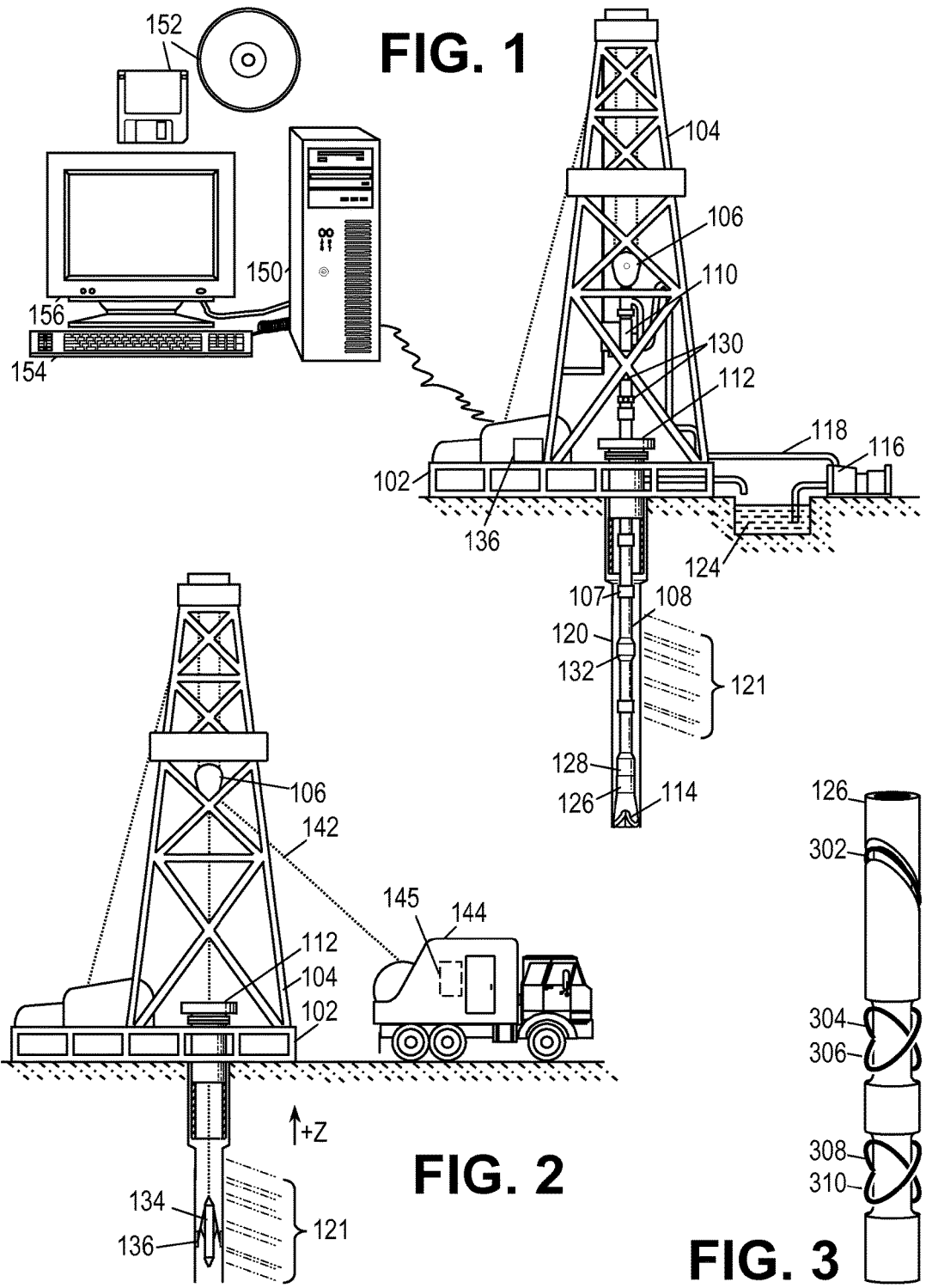

US 10,227,861 B2

CROSS-COUPLING BASED DETERMINATION OF ANISOTROPIC FORMATION PROPERTIES

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation.

Many formations have resistive anisotropy, a property which is generally attributable to extremely fine layering during the sedimentary build-up of the formation. Hence, in a coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. The resistivity in a direction parallel to the plane of the formation (i.e., the x-y plane) is known as the horizontal resistivity, $R_h$, and the resistivity in the direction normal (i.e., perpendicular) to the plane of the formation (the z direction) is known as the vertical resistivity, $R_v$. The index of anisotropy, $\lambda$, is defined as $\lambda = [R_v/R_h]^{1/2}$.

The relative dip angle, $\alpha$, is the angle between the tool axis and the normal to the plane of the formation. Resistive anisotropy and relative dip angle each have significant but complex effects on resistivity logging tool measurements. Various techniques have been developed for extracting resistivity and dip information from tool measurements, including U.S. Pat. No. 6,393,364, titled "Determination of conductivity in anisotropic dipping formations from magnetic coupling measurements" by inventors L. Gao and S. Gianzero. As an iterative technique based on an analytical analysis of the logging environment, Gao and Gianzero's technique offers a fast conversion of measurement information to formation parameter information that is reliable and that works over a extended range of possible formation parameter values. However, their technique relies heavily on a "diagonal" coupling measurement, i.e., a measurement between parallel transmitter and receiver antennas. In many logging tools, this measurement is undesirably sensitive to small dimensional changes in the tool, e.g., those caused by thermal expansion or contraction and those caused by mechanical impacts or vibration, making it unduly difficult to obtain accurate formation information from the logging tool measurements.

BRIEF DESCRIPTION OF THE DRAWINGS

A better understanding of the disclosed embodiments can be obtained when the following detailed description is considered in conjunction with the attached drawings, in which:

FIG. 1 shows an illustrative logging while drilling environment including dipping formation beds.

FIG. 2 shows an illustrative wireline logging environment including dipping formation beds.

FIG. 3 shows an illustrative antenna configuration for a multi-component induction logging tool.

Figure 4:
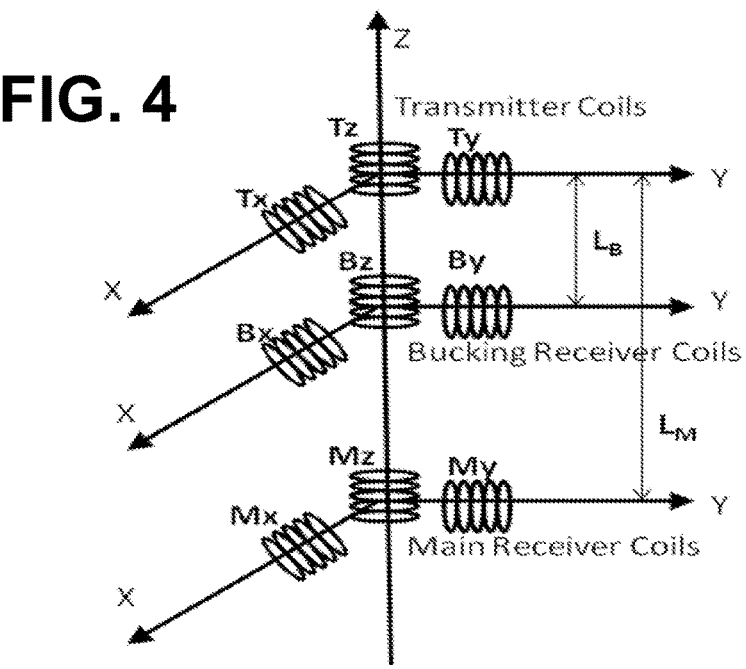
FIG. 4 shows an illustrative tool model suitable for defining a measured magnetic coupling tensor.

By way of example, specific system and method embodiments are shown in the drawings and are described in detail below. It should be understood, however, that the drawings and detailed description are not intended to limit the disclosure, but on the contrary, the intention is to cover all modifications, equivalents, and alternatives falling within the scope of the appended claims.

DETAILED DESCRIPTION

Accordingly various tools, systems, and methods are disclosed for multi-component induction logging with iterative analytical conversion of tool measurements to formation parameters. At least some system embodiments include a logging tool and at least one processor. The logging tool provides transmitter-receiver coupling measurements that include at least diagonal coupling measurements (Hzz, Hxx, and/or Hyy) and cross-coupling measurements (Hxy, Hxz, and Hyz). The processor employs an iterative analytical conversion of the cross-coupling measurements into formation resistive anisotropy and dip information. The processor may further provide one or more logs of the resistive anisotropy and/or dip information.

The disclosed tool, systems and methods are best understood in a suitable usage context. Accordingly, FIG. 1 shows an illustrative logging while drilling (LWD) environment. A drilling platform 102 is equipped with a derrick 104 that supports a hoist 106 for raising and lowering a drill string 108. The hoist 106 suspends a top drive 110 that rotates the drill string 108 as the drill string is lowered through the wellhead 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

In wells employing acoustic telemetry for LWD, downhole sensors (including resistivity logging tool 126) are coupled to a telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals provide them to a data acquisition system 136 for conversion to a digital data stream. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the tool, thereby enabling adjustment of the tool's configuration and operating parameters. In some embodiments, the telemetry module 128 also or alternatively stores measurements for later retrieval when the tool returns to the surface.

The data acquisition system 136 communicates the digital data stream to a computer system 150 or some other form of a data processing device. Computer 150 operates in accordance with software (which may be stored on information storage media 152) and user input (received via an input device 154) to extract the measurement data from the digital data stream. The resulting measurement data may be further analyzed and processed by computer 150 to generate a display of useful information on a computer monitor 156 or some other form of a display device. For example, the computer may provide logs of formation conductivity and dip.

A resistivity logging tool 126 is integrated into the bottom-hole assembly near the bit 114. The logging tool 126 may take the form of a drill collar, i.e., a thick-walled tubular that provides weight and rigidity to aid the drilling process. As the bit extends the borehole through the formations, logging tool 126 collects multicomponent magnetic coupling measurements as well as measurements of the tool orientation and position and various other drilling conditions.

The orientation measurements may be obtained using an orientation indicator, which may include magnetometers, inclinometers, and/or accelerometers, though other sensor types such as gyroscopes may be used. Preferably, the tool includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, various resistivity logging tools disclosed herein can be used to steer the bit with respect to desirable formation beds.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity logging portion of the logging tool 134 may have centralizing arms 136 that center the tool within the borehole as the tool is pulled uphole. A logging facility 144 collects measurements from the logging tool 134, and includes computing facilities 145 for processing and storing the measurements gathered by the logging tool.

FIG. 3 shows an illustrative resistivity logging while drilling tool 126 having antennas for acquiring multi-component induction logging measurements. Resistivity logging tool 126 has a tilted transmit antenna 302 and two pairs of tilted receive antennas 306, 306 and 308, 310, thereby providing four transmit-receive antenna pairings. The tool acquires attenuation and phase measurements of each receive antenna's response to transmit antenna 302. In certain alternative embodiments, the tool measures in-phase and quadrature-phase components of the receive signals (with respect to the transmitter or reference signal) rather than measuring amplitude and phase. In either case, these measurements are collected and stored as a function of the tool's position and rotational orientation in the borehole.

The illustrated tool has receive antennas 304 and 308 oriented parallel to the transmit antenna 302, and receive antennas 306 and 310 oriented perpendicular to the transmit antenna. In the illustrated example, each of the antennas share a common rotational orientation, with antennas 302, 304, 308 being tilted at −45° and antennas 306, 310 being tilted at +45° relative to the longitudinal tool axis. In the illustrative tool embodiments, each of the coil antennas surrounding the tool is mounted in a recess and protected by a non-conductive filler material and/or a shield having non-conducting apertures. The tool body is primarily composed of steel. The relative tool dimensions and antenna spacings are subject to a great deal of variation depending on the desired tool properties. The distance between the receive coil pairs may be on the order of 0.25 m, while the spacing of the transmit coil to the midpoint between the receiver pairs may vary from about 0.4 m to over 10 m.

As disclosed in U.S. patent application Ser. No. 12/294, 557 "Antenna Coupling Component Measurement Tool . . . " filed Sep. 25, 2008 by inventors Michael Bittar and David Hu, the measurements taken by a tool of this kind as it rotates enable a full set of orthogonal coupling component measurements to be obtained at each point along the borehole axis. The orthogonal coupling component measurements correspond to the tool model shown in FIG. 4. (Wireline logging tool embodiments may have actual antennas corresponding to the illustrated model.) A triad of transmitters Tx, Ty, Tz, represent magnetic dipole antennas oriented parallel to the tool's x, y, and z axes respectively. A triad of main receivers $R_x^m, R_y^m, R_z^m$ similarly represent magnetic dipole antennas oriented along these axes, as do a triad of bucking receivers $R_x^b, R_y^b, R_z^b$. The main receiver triad is spaced at a distance Lm from the transmitter triad, and the bucking receiver triad is spaced at a distance Lb from the transmitter triad. The signal measurements of the bucking receiver triad can be subtracted from the main receiver triad to eliminate the direct signal from the transmitter and increase sensitivity to formation properties.

Figure 5:
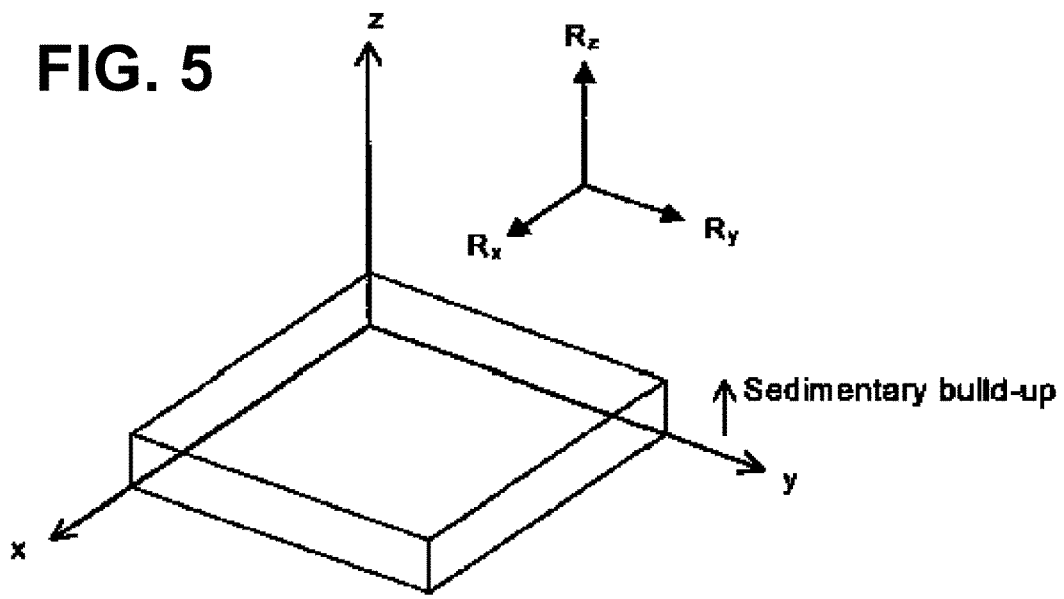
FIG. 5 is a schematic perspective view of a Cartesian coordinate system in a sedimentary earth formation.

Multi-component tools are sensitive to the resistive anisotropy of formations. When measuring anisotropic formation resistivity and orientation, it is convenient to use the formation coordinate system shown in FIG. 5. FIG. 5 shows a portion of a sedimentary formation bed, with the z-axis oriented perpendicular to the plane of the formation in the direction of the sedimentary accretion. As previously mentioned, the formation resistivity when measured along this axis is often different than formation resistivity measured in the x-y plane. That is, most sedimentary formations are approximately transversely-isotropic (TI), with their conductivity tensor having the form:

$$\sigma = \begin{bmatrix} \sigma_h & 0 & 0 \\ 0 & \sigma_h & 0 \\ 0 & 0 & \sigma_v \end{bmatrix} \quad (1)$$

where $\sigma_h$ and $\sigma_v$ are horizontal and vertical conductivity of the formation. Resistivity is the inverse of conductivity and, because a given conductivity value has a unique corresponding resistivity value, these terms may be used interchangeably.

Note, the terms "horizontal" and "vertical" are usually employed to refer to the in-plane and normal axes of the formation even if the formation is not horizontal. When the bed not horizontal, the x-axis is often chosen to be oriented in the direction of deepest ascent, i.e., "uphill". Referring momentarily back to FIGS. 1 and 2, note that formations 121 are not perpendicular to the borehole, a situation that may occur naturally or may occur due to directional drilling operations. Consequently, the tool coordinate system (as represented in FIG. 4) does not generally correspond to the formation coordinate system. In addition, a third coordinate system is employed herein for the borehole. The borehole coordinate system has a z-axis that follows the central axis of the borehole. The x-axis of the borehole extends perpendicularly from the central axis through the high side of the borehole. (In a vertical borehole, the x-axis extends through the north side of the borehole.) The y-axis extends perpendicular to the other two axes in accordance with the right-hand rule.

Figure 6:
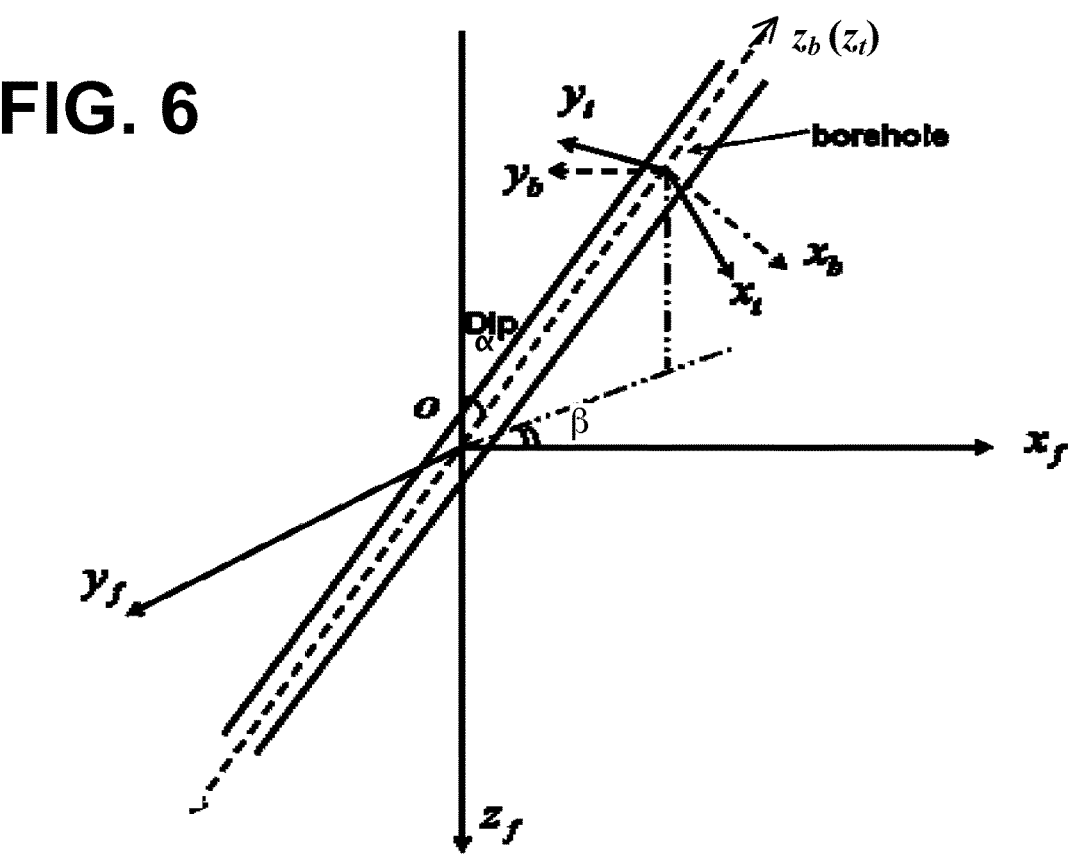
FIG. 6 shows a relationship between the coordinate systems of a tool, a borehole and a dipping formation bed.

FIG. 6 illustrates how the three coordinate systems may be related. The formation coordinate system $x_f$, $y_f$, $z_f$, is tied to the formation as explained previously, though due to symmetry the x- and y-axes can be shifted without affecting measurement of the formation properties. A borehole penetrates the formation. The angle between the formation z-axis and the central axis of the borehole is called the dip angle $\alpha$. The strike angle $\beta$ is the angle between the $x_f$-axis and the projection of the borehole axis into the $x_f$-$y_f$ plane. Because of the previously mentioned symmetry, the formation $x_f$-axis can be arbitrarily positioned so that the strike angle $\beta$ is nonzero.

FIG. 4 represents a baseline multicomponent tool configuration that serves as the foundation for the following analyses. Because the baseline tool measurements can be derived from other tool configurations such as that shown in FIG. 3, the following analyses are readily applicable to all such tools, assuming of course that the tool provides measurements of at least the necessary components.

In the antenna configuration of FIG. 4, if each transmitter is fired in turn, and signal measurements are made for each receiver (or more specifically, for each main receiver coil signal minus the correspondingly oriented bucking receiver coil signal) in response to each firing, nine differential voltage measurements are obtained. These nine measurements enable the determination of a complete multicomponent signal matrix V with elements $V_{IJ}$, where I is the index for transmitter axis x, y, z, and J is the index for receiver axis x, y, z, and $V_{IJ}$ is a complex value representing the signal amplitude and phase shift measured by receiver J in response to the firing of transmitter I.) Given a multicomponent signal matrix for any given orientation of the tool, the system can apply simple rotational transformations to determine a corresponding matrix for any arbitrary tool orientation.

The signal matrix elements $V_{IJ}$ can be converted to equivalent magnetic fields at the position of the receivers. In the following sections, normalized magnetic fields are used in all derived formulations:

$$H_{IJ} = \frac{V_{IJ}}{i\omega\mu(S_T N_T I_T)(S_M N_M)} \quad (2)$$

where $\omega=2\pi f$ is angular frequency of the transmitted signal; $\mu=4\pi 10^{-7}$ is magnetic permeability; $S_T$ is the transmitter surface area; $N_T$ is the number of turns of the transmitter coil; $I_T$ is the current applied in the transmitter; $S_M$ is the main receiver surface area; $N_M$ is the number of turns of the main receiver coil. If desired, the formulations derived in the following can be easily rewritten in terms of voltage instead of magnetic field.

Beginning with in the tool's coordinate system the matrix for the magnetic field responses in general can be expressed as the following matrix $H^t$:

$$H^t = \begin{bmatrix} H^t_{xx} & H^t_{xy} & H^t_{xz} \\ H^t_{yx} & H^t_{yy} & H^t_{yz} \\ H^t_{zx} & H^t_{zy} & H^t_{zz} \end{bmatrix}. \quad (3)$$

Assuming a strike angle of zero (e.g., as would be observed in the borehole coordinate system) the magnetic field responses for a tilted (i.e., dipping) transversely isotropic formation would have the following form:

$$H = \begin{bmatrix} H_{xx} & 0 & H_{xz} \\ 0 & H_{yy} & 0 \\ H_{zx} & 0 & H_{zz} \end{bmatrix} \quad (4)$$

The two forms are related by a rotation $$H^t = R^* H R \quad (5)$$

where R is determined by the strike angle ($\beta$):

$$R = \begin{bmatrix} \cos\beta & \sin\beta & 0 \\ -\sin\beta & \cos\beta & 0 \\ 0 & 0 & 1 \end{bmatrix} \quad (6)$$

and R* is the transpose of R. From the above equations, it can be shown that $$\begin{bmatrix} H^t_{xx} & H^t_{xy} & H^t_{xz} \\ H^t_{yx} & H^t_{yy} & H^t_{yz} \\ H^t_{zx} & H^t_{zy} & H^t_{zz} \end{bmatrix} = \quad (7)$$

$$\begin{bmatrix} H_{xx}\cos^2\beta + H_{yy}\sin^2\beta & (H_{xx} - H_{yy})\cos\beta\sin\beta & H_{xz}\cos\beta \\ (H_{xx} - H_{yy})\cos\beta\sin\beta & H_{yy}\cos^2\beta + H_{xx}\sin^2\beta & H_{xz}\sin\beta \\ H_{zx}\cos\beta & H_{zx}\sin\beta & H_{zz} \end{bmatrix}$$

making it possible to determine the strike angle from any one of the following equations:

$$\beta = \arctan\left(\frac{H^t_{zy}}{H^t_{xz}}\right) \quad (8a)$$

$$\beta = \arctan\left(\frac{H^t_{zy}}{H^t_{zx}}\right) \quad (8b)$$

$$\beta = \arctan\left(\frac{H^t_{xy} + H^t_{yx}}{H^t_{xx} - H^t_{yy}}\right)/2 \quad (8c)$$

For reasons explained further below it is undesirable to rely too heavily on the diagonal components, and accordingly, equations (8a) or (8b) may be preferred over equation (8c). The authors of the present disclosure further believe that the real part of the magnetic field (which corresponds to the imaginary part of the measured voltage) may be preferred as the basis of the strike angle calculation. The strike angle having been determined, the tool's magnetic response matrix can (if desired) be rotated into the borehole coordinate system:

$$H = RH'R^* \quad (9)$$

where only five non-zero components exist. In the following analysis, a zero strike angle is not particularly desirable, so the response matrix rotation may be employed as needed to ensure that the strike angle magnitude is greater than, e.g., 30°.

The matrix H is then analyzed by the following approach to estimate various formation parameters such as the horizontal conductivity $\sigma_h$, horizontal resistivity $R_h$, vertical conductivity $\sigma_v$, vertical resistivity $R_v$, and/or formation dip $\alpha$. As the diagonal response components ($H_{xx}$, $H_{yy}$, and $H_{zz}$) have direct signal components that need to be carefully canceled, they may often exhibit an undesirable sensitivity to small dimensional changes in the tool. The following analysis accordingly relies on the cross-components of the response matrix. Assuming $H_{IJ}=H_{JI}$, there are only three cross-components and they have the following analytical expressions:

$$H_{xz} = \frac{\cos\beta\sin(2\alpha)}{8\pi L_M^3 \sin^2(\alpha)} ik_h L_M (e^{ik_h L_M A} - e^{ik_h L_M}) + \quad (10)$$
$$P * \frac{\cos\beta\sin(2\alpha)}{8\pi L_B^3 \sin^2(\alpha)} ik_h L_B (e^{ik_h L_B A} - e^{ik_h L_B})$$

$$H_{yz} = \frac{\sin\beta\sin(2\alpha)}{8\pi L_M^3 \sin^2(\alpha)} ik_h L_M (e^{ik_h L_M A} - e^{ik_h L_M}) + \quad (11)$$
$$P * \frac{\sin\beta\sin(2\alpha)}{8\pi L_B^3 \sin^2(\alpha)} ik_h L_B (e^{ik_h L_B A} - e^{ik_h L_B})$$

$$H_{xy} = \frac{\sin 2\beta}{8\pi L_M^3} \left[ \begin{array}{c} k_h^2 L_M^2 \left( e^{ik_h L_M} - \frac{e^{ik_h L_M A}}{A\lambda^2} \right) + \\ ik_h L_M (e^{ik_h L_M A} - e^{ik_h L_M}) \frac{\cos^2\alpha + 1}{\sin^2\alpha} \end{array} \right] + P * \frac{\sin 2\beta}{8\pi L_B^3} \quad (12)$$
$$\left[ k_h^2 L_B^2 \left( e^{ik_h L_B} - \frac{e^{ik_h L_B A}}{A\lambda^2} \right) + ik_h L_B (e^{ik_h L_B A} - e^{ik_h L_B}) \frac{\cos^2\alpha + 1}{\sin^2\alpha} \right]$$

where $k_h = \sqrt{i\omega\mu\sigma_h}$ is horizontal wave number; $\sigma_h$ and $\sigma_v$ horizontal and vertical conductivity; $\lambda = \sqrt{\sigma_h/\sigma_v} = \sqrt{R_v/R_h}$ is anisotropy coefficient; $A = \sqrt{\sin^2\alpha + \lambda^2 \cos^2\alpha}/\lambda$ is anisotropy factor; $L_B$ and $L_M$ transmitter-receiver spacing for bucking receiver and main receiver; $P = -(L_B/L_M)^3$ is bucking coefficient to cancel direct signal of tool at vacuum.

Neglecting the imaginary parts of equations (10)-(12) and taking the limit as $L_M$ and $L_B$ approach zero, we get $$(H_{xz})_R \to [1+P] \frac{\cos\beta\cot\alpha}{4\pi\delta_h^3} (A^2-1) \quad (13)$$

$$(H_{yz})_R \to [1+P] \frac{\sin\beta\cot\alpha}{4\pi\delta_h^3} (A^2-1) \quad (14)$$

$$(H_{xz})_R \to [1+P] \frac{\sin 2\beta}{8\pi\delta_h^3} (A^2-1) \quad (15)$$

where $$\delta_h = \sqrt{\frac{2}{\mu\omega\sigma_h}}$$

is the skin depth associated with the horizontal conductivity. From these equations, an estimate of the dip angle $\alpha$ can be derived:

$$\alpha = \arctan\left[ \sqrt{\left(\frac{(H_{xy})_R}{(H_{xz})_R}\right)^2 + \left(\frac{(H_{xy})_R}{(H_{yz})_R}\right)^2} \right] \quad (16)$$

and, having the dip angle, the anisotropy factor A (defined as $\sqrt{\sin^2\alpha + \lambda^2\cos^2\alpha}/\lambda$) and horizontal conductivity $\sigma_h$ can be calculated:

$$A \approx \frac{1}{1 + \frac{(H_{xy})_X - (H_{xy})_R}{(H_{xz})_X - (H_{xz})_R} * \frac{\tan\alpha}{\sin\beta}} \quad (17)$$

$$\sigma_h \approx \frac{4\pi}{\mu\omega\left[\frac{1}{L_M} + \frac{P}{L_B}\right]} \frac{[(H_{xz})_X - (H_{xz})_R]}{(1-A)} \frac{\tan\alpha}{\cos\beta} \quad (18)$$

These estimates may be expected to be accurate so long as the transmitter-receiver spacings $L_M$ and $L_B$ are significantly less than the skin depth $\delta_h$.

For better accuracy across the range of possible formation properties, an iterative procedure can be applied based on a fifth-order Taylor series expansion:

$$(H_{xz})_R \approx \frac{\cos\beta}{8\pi L_M^3} \frac{\sin 2\alpha}{\sin^2\alpha} \left[ (A^2-1)\left(\frac{L_M}{\delta}\right)^3 + \right. \quad (19a)$$
$$\left. \frac{2(1-A^3)}{3}\left(\frac{L_M}{\delta}\right)^4 - \frac{(1-A^4)}{6}\left(\frac{L_M}{\delta}\right)^5 \right] + P * \frac{\cos\beta}{8\pi L_B^3}$$
$$\frac{\sin 2\alpha}{\sin^2\alpha} \left[ (A^2-1)\left(\frac{L_B}{\delta}\right)^3 + \frac{2(1-A^3)}{3}\left(\frac{L_B}{\delta}\right)^4 - \frac{(1-A^4)}{6}\left(\frac{L_B}{\delta}\right)^5 \right]$$

$$(H_{xz})_X \approx \frac{\cos\beta}{8\pi L_M^3} \frac{\sin 2\alpha}{\sin^2\alpha} \left[ -2(A-1)\left(\frac{L_M}{\delta}\right)^2 + \right. \quad (19b)$$
$$\left. (A^2-1)\left(\frac{L_M}{\delta}\right)^3 + \frac{(1-A^4)}{6}\left(\frac{L_M}{\delta}\right)^5 \right] + P * \frac{\cos\beta}{8\pi L_B^3}$$
$$\frac{\sin 2\alpha}{\sin^2\alpha} \left[ -2(A-1)\left(\frac{L_B}{\delta}\right)^2 + (A^2-1)\left(\frac{L_B}{\delta}\right)^3 + \frac{(1-A^4)}{6}\left(\frac{L_B}{\delta}\right)^5 \right]$$

$$(H_{xy})_R \approx \frac{\sin 2\beta}{8\pi L_M^3} \left[ (A^2-1)\left(\frac{L_M}{\delta}\right)^3 + T_1\left(\frac{L_M}{\delta}\right)^4 + T_2\left(\frac{L_M}{\delta}\right)^5 \right] + \quad (20a)$$
$$P * \frac{\sin 2\beta}{8\pi L_B^3} \left[ (A^2-1)\left(\frac{L_B}{\delta}\right)^3 + T_1\left(\frac{L_B}{\delta}\right)^4 + T_2\left(\frac{L_B}{\delta}\right)^5 \right]$$

-continued $$(H_{xy})_X = \approx \qquad (20b)$$
$$\frac{\sin 2\beta}{8\pi L_M^3}\left[\frac{2(A-1)^2}{A}\cot^2\alpha\left(\frac{L_M}{\delta}\right)^2 + (A^2-1)\left(\frac{L_M}{\delta}\right)^3 - T_2\left(\frac{L_M}{\delta}\right)^5\right] +$$
$$P*\frac{\sin 2\beta}{8\pi L_B^3}\left[\frac{2(A-1)^2}{A}\cot^2\alpha\left(\frac{L_B}{\delta}\right)^2 + (A^2-1)\left(\frac{L_B}{\delta}\right)^3 - T_2\left(\frac{L_B}{\delta}\right)^5\right]$$

where $$T_1 = \frac{2}{3}(\cos^2\alpha + 1)(A^3-1) - 2A(A^2-\cos^2\alpha) + 2\sin^2\alpha \qquad (20c)$$

$$T_2 = -\frac{1}{6}(\cos^2\alpha+1)(A^4-1) + \frac{2}{3}A^2(A^2-\cos^2\alpha) - \frac{2}{3}\sin^2\alpha \qquad (20d)$$

The higher-order terms in these expansions provide correction factors for use in equations (17) and (18) to provide iterative updates:

$$\Gamma_{xz} = (H_{xz})_X - (H_{xz})_R = \qquad (21)$$
$$\frac{\cos\beta}{8\pi L_M^3}\frac{\sin 2\alpha}{\sin^2\alpha}\left[-\frac{2}{3}(1-A^3)\left(\frac{L_M}{\delta}\right)^4 + \frac{1}{3}(1-A^4)\left(\frac{L_M}{\delta}\right)^5\right] +$$
$$P*\frac{\cos\beta}{8\pi L_B^3}\frac{\sin 2\alpha}{\sin^2\alpha}\left[-\frac{2}{3}(1-A^3)\left(\frac{L_B}{\delta}\right)^4 + \frac{1}{3}(1-A^4)\left(\frac{L_B}{\delta}\right)^5\right]$$

$$\Gamma_{xy} = (H_{xy})_X - (H_{xy})_R = \frac{\sin 2\beta}{8\pi L_M^3 \sin^2\alpha}\left[-T_1\left(\frac{L_M}{\delta}\right)^4 - 2T_2\left(\frac{L_M}{\delta}\right)^5\right] + \qquad (22)$$
$$P*\frac{\sin 2\beta}{8\pi L_B^3 \sin^2\alpha}\left[-T_1\left(\frac{L_B}{\delta}\right)^4 - 2T_2\left(\frac{L_B}{\delta}\right)^5\right]$$

$$A \approx \frac{1}{1 + \frac{(H_{xy})_X - (H_{xy})_R - \Gamma_{xy}}{(H_{xz})_X - (H_{xz})_R - \Gamma_{xz}}*\frac{\tan\alpha}{\sin\beta}} \qquad (23)$$

$$\sigma_h \approx \frac{4\pi}{\mu\omega\left[\frac{1}{L_M} + \frac{P}{L_B}\right]}\frac{[(H_{xz})_X - (H_{xz})_R]\tan\alpha}{(1-A)\cos\beta} \qquad (24)$$

Correction terms can also be obtained to update the formation dip angle calculation:

$$\Lambda_{xz} = \frac{\cos\beta}{8\pi L_M^3}\frac{\sin 2\alpha}{\sin^2\alpha}\left[\frac{2}{3}(1-A^3)\left(\frac{L_M}{\delta}\right)^4 - \frac{1}{6}(1-A^4)\left(\frac{L_M}{\delta}\right)^5\right] + \qquad (25)$$
$$P*\frac{\cos\beta}{8\pi L_B^3}\frac{\sin 2\alpha}{\sin^2\alpha}\left[\frac{2}{3}(1-A^3)\left(\frac{L_B}{\delta}\right)^4 - \frac{1}{6}(1-A^4)\left(\frac{L_B}{\delta}\right)^5\right]$$

$$\Lambda_{yz} = \frac{\sin\beta}{8\pi L_M^3}\frac{\sin 2\alpha}{\sin^2\alpha}\left[\frac{2}{3}(1-A^3)\left(\frac{L_M}{\delta}\right)^4 - \frac{1}{6}(1-A^4)\left(\frac{L_M}{\delta}\right)^5\right] + \qquad (26)$$
$$P*\frac{\sin\beta}{8\pi L_B^3}\frac{\sin 2\alpha}{\sin^2\alpha}\left[\frac{2}{3}(1-A^3)\left(\frac{L_B}{\delta}\right)^4 - \frac{1}{6}(1-A^4)\left(\frac{L_B}{\delta}\right)^5\right]$$

$$\Lambda_{xy} = \frac{\sin 2\beta}{8\pi L_M^3}\left[T_1\left(\frac{L_M}{\delta}\right)^4 + T_2\left(\frac{L_M}{\delta}\right)^5\right] + P*\frac{\sin 2\beta}{8\pi L_B^3}\left[T_1\left(\frac{L_B}{\delta}\right)^4 + T_2\left(\frac{L_B}{\delta}\right)^5\right] \qquad (27)$$

$$\alpha = \arctan\left[\sqrt{\left(\frac{(H_{xy})_R - \Lambda_{xy}}{(H_{xz})_R - \Lambda_{xz}}\right)^2 + \left(\frac{(H_{xy})_R - \Lambda_{xy}}{(H_{yz})_R - \Lambda_{yz}}\right)^2}\right] \qquad (28)$$

Although the above derivations are conducted for multi-component induction tools with bucking receiver, similar equations can be obtained for multi-component induction tools without bucking receiver. In particular, the equations for cross-components (Hxy, Hxz, Hyz) can be derived simply by using zero value for P.

Based upon the foregoing derivations, then, we describe an illustrative logging method that is resistant to those diagonal component measurement errors that may result from small dimensional changes in electromagnetic resistivity logging tools. The method can be implemented in real time during the logging operation, or as a post-logging operation to extract formation parameters from the already-acquired logging data. Though it is feasible to perform the processing in a downhole processor, it is usually preferred to carry out the analysis with a general purpose processing system at the surface. It is this latter circumstance that is assumed in the following description.

Figure 7:
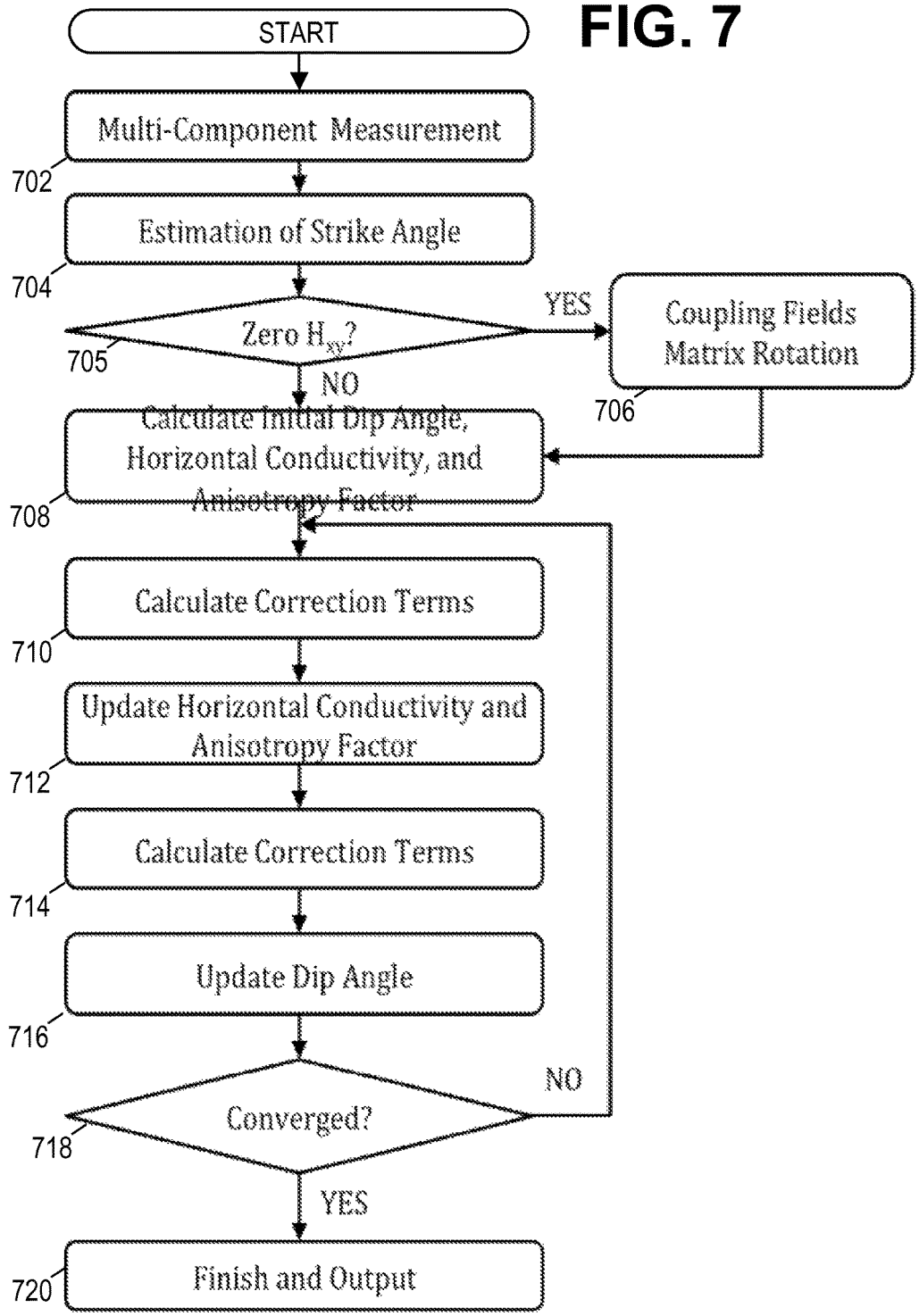
FIG. 7 is a flow diagram of an iterative analytical method for extracting formation parameter values.

As shown in FIG. 7, the illustrative method begins with the computer obtaining the multicomponent induction tool measurement data in block 702. Some pre-processing of the data may be required to obtain the normalized magnetic field response components from the tool measurements. Since the $H_{IJ}$ values are obtained as a function of tool position, the following operations are repeated for each tool position.

In block 704, the computer estimates the strike angle using, e.g., equations (8a) or (8b), which are equivalent if the assumption holds true that $H_{IJ}=H_{JI}$. In block 705, the computer checks to determine if the cross component $H_{XY}$ is zero. If yes, the computer rotates the magnetic field response matrix in block 706 in an attempt to find a strike angle where this component is nonzero. In block 708, the computer calculates an initial dip angle, an initial horizontal conductivity, and an initial anisotropy factor. Suitable equations for this determination include:

$$\alpha_1 = \arctan\left[\sqrt{\left(\frac{(H_{xy})_R}{(H_{xz})_R}\right)^2 + \left(\frac{(H_{xy})_R}{(H_{yz})_R}\right)^2}\right], \qquad (29)$$

$$A_1 = \frac{1}{1 + \frac{(H_{xy})_X - (H_{xy})_R}{(H_{xz})_X - (H_{xz})_R}*\frac{\tan\alpha_1}{\sin\beta}} \qquad (30)$$

$$\sigma_1 = K_1\frac{[(H_{xz})_X - (H_{xz})_R]\tan\alpha_1}{(1-A_1)\cos\beta} \qquad (31)$$

where $K_1$ is a tool constant (obtainable from equation (18)). In block 710, the computer calculates iterative correction terms to update the anisotropy factor and conductivity estimates. Suitable equations for this determination include:

$$\Gamma_{xz} = \frac{\cos\beta\sin 2\alpha_i}{\sin^2\alpha_i}\left[\begin{array}{l}-\frac{2}{3}(1-A_i^3)\left\{K_2\left(\frac{L_M}{\delta_i}\right)^4 + K_3\left(\frac{L_B}{\delta_i}\right)^4\right\} + \\ \frac{1}{3}(1-A_i^4)\left\{K_2\left(\frac{L_M}{\delta_i}\right)^5 + K_3\left(\frac{L_B}{\delta_i}\right)^5\right\}\end{array}\right] \qquad (32)$$

$$\Gamma_{xy} = \frac{\sin 2\beta}{\sin^2\alpha_i}\left[\begin{array}{l}-T_1\left\{K_2\left(\frac{L_M}{\delta_i}\right)^4 + K_3\left(\frac{L_B}{\delta_i}\right)^4\right\} - \\ 2T_2\left\{K_2\left(\frac{L_M}{\delta_i}\right)^5 + K_3\left(\frac{L_B}{\delta_i}\right)^5\right\}\end{array}\right] \qquad (33a)$$

$$T_1 = \frac{2}{3}(\cos^2\alpha_i + 1)(A_i^3-1) - 2A_i(A_i^2-\cos^2\alpha_i) + 2\sin^2\alpha_i \qquad (33b)$$

$$T_2 = -\frac{1}{6}(\cos^2\alpha_i+1)(A_i^4-1) + \frac{2}{3}A_i^2(A_i^2-\cos^2\alpha_i) - \frac{2}{3}\sin^2\alpha_i \qquad (33c)$$

where $K_2$ and $K_3$ are tool constants (obtainable from equations (21) or (22)). These iterative correction terms can then be employed in block 712 to update the anisotropy factor and conductivity. Suitable equations include $$A_{i+1} = \frac{1}{1 + \frac{(H_{xy})_X - (H_{xy})_R - \Gamma_{xy}}{(H_{xz})_X - (H_{xz})_R - \Gamma_{xz}} * \frac{\tan\alpha_i}{\sin\beta}}, \quad (34)$$

$$\sigma_{i+1} = K_1 \frac{[(H_{xz})_X - (H_{xz})_R]}{(1 - A_{i+1})} \frac{\tan\alpha_i}{\cos\beta} \quad (35)$$

With these updated estimates, the computer in block 714 determines iterative correction terms for the dip angle. Suitable equations include:

$$\Lambda_{xz} = \frac{\cos\beta\sin 2\alpha_i}{\sin^2\alpha_i} \begin{bmatrix} \frac{2}{3}(1 - A_{i+1}^3)\left(K_2\left(\frac{L_M}{\delta_{i+1}}\right)^4 + K_3\left(\frac{L_B}{\delta_{i+1}}\right)^4\right) - \\ \frac{1}{6}(1 - A_{i+1}^4)\left(K_2\left(\frac{L_M}{\delta_{i+1}}\right)^5 + K_3\left(\frac{L_B}{\delta_{i+1}}\right)^5\right) \end{bmatrix} \quad (36)$$

$$\Lambda_{yz} = \frac{\sin\beta\sin 2\alpha_i}{\sin^2\alpha_i} \begin{bmatrix} \frac{2}{3}(1 - A_{i+1}^3)\left(K_2\left(\frac{L_M}{\delta_{i+1}}\right)^4 + K_3\left(\frac{L_B}{\delta_{i+1}}\right)^4\right) - \\ \frac{1}{6}(1 - A_{i+1}^4)\left(K_2\left(\frac{L_M}{\delta_{i+1}}\right)^5 + K_3\left(\frac{L_B}{\delta_{i+1}}\right)^5\right) \end{bmatrix} \quad (37)$$

$$\Lambda_{xy} = \frac{\sin 2\beta}{\sin^2\alpha_i} \begin{bmatrix} T_1\left(K_2\left(\frac{L_M}{\delta_{i+1}}\right)^4 + K_3\left(\frac{L_B}{\delta_{i+1}}\right)^4\right) + \\ T_2\left(K_2\left(\frac{L_M}{\delta_{i+1}}\right)^5 + K_3\left(\frac{L_B}{\delta_{i+1}}\right)^5\right) \end{bmatrix} \quad (38a)$$

$$T_1 = \frac{2}{3}(\cos^2\alpha_i + 1)(A_{i+1}^3 - 1) - 2A_{i+1}(A_{i+1}^2 - \cos^2\alpha_i) + 2\sin^2\alpha_i \quad (38b)$$

$$T_2 = -\frac{1}{6}(\cos^2\alpha_i + 1)(A_{i+1}^4 - 1) + \frac{2}{3}A_{i+1}^2(A_{i+1}^2 - \cos^2\alpha_i) - \frac{2}{3}\sin^2\alpha_i \quad (38c)$$

These iterative correction terms can then be employed in block 716 to update the dip angle estimate. Suitable equations include $$\alpha_{i+1} = \arctan\left[\sqrt{\left(\frac{(H_{xy})_R - \Lambda_{xy}}{(H_{xz})_R - \Lambda_{xz}}\right)^2 + \left(\frac{(H_{xy})_R - \Lambda_{xy}}{(H_{yz})_R - \Lambda_{yz}}\right)^2}\right] \quad (39)$$

In block 718, the computer determines whether convergence has been achieved and if not, it repeats blocks 710-718. Otherwise the computer generates a display based on the calculated formation parameters and terminates. The display may include a log of dip angle, horizontal conductivity, vertical conductivity, and anisotropy factor. (Note that the index of anisotropy can be determined from the anisotropy factor, and that the vertical conductivity can be determined by combining the index of anisotropy with the horizontal conductivity.)

Figure 8A:
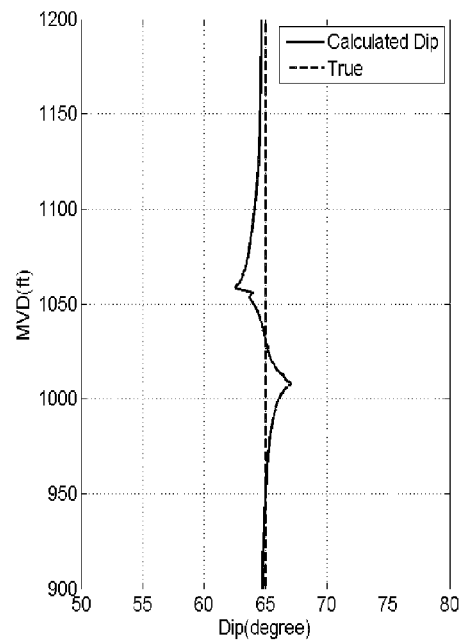
FIGS. 8A-8D show illustrative formation parameter logs.
Figure 8B:
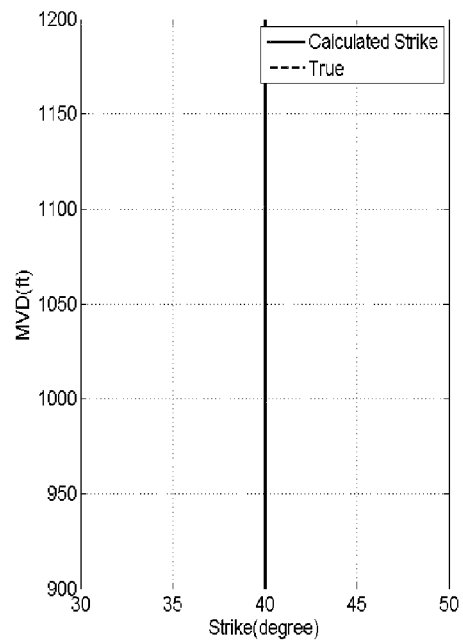
Figure 8C:
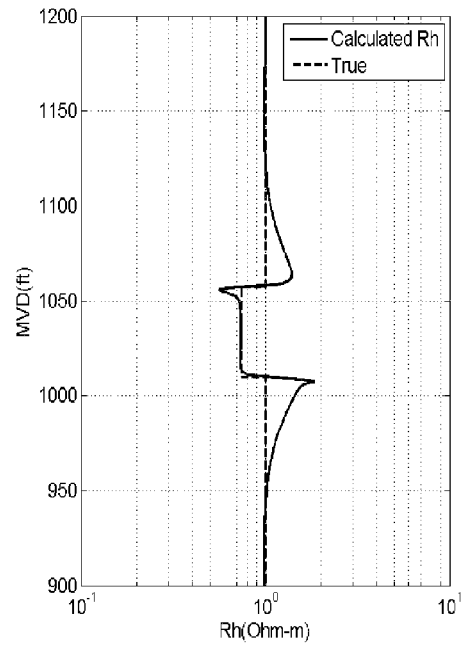
Figure 8D:
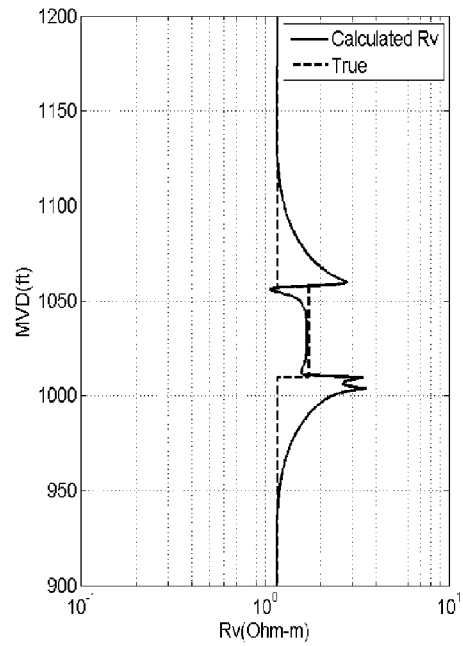

To test the described methods, we provide a synthetic example. A multi-component induction tool with a main transmitter-receiver spacing at 20 inch and a bucking coil spacing at 17 inch is operated at 12 KHz. The formation example is a three-layer anisotropic formation with a dip at 66° and a strike angle at 40°. The thickness of middle layer is 20 feet. For the middle layer, $R_h$=5.5 Ohm-m and $R_v$=55 Ohm-m. For the other layers, $R_h$=10 Ohm-m and $R_v$=15 Ohm-m. Simulation results using the first method are compared with true formation parameter values in FIGS. 8a-8d. Though some deviation from the true dip angle is visible at the boundaries in FIG. 8a, the estimated dip angle is nonetheless quite good. As shown in FIG. 8b, the strike angle calculation is also quite good. The estimated horizontal and vertical resistivities as shown in FIGS. 8c and 8d are fairly decent, though at the formation boundaries deviations by a factor of 2-3 are evident. The deviation at the bed boundaries is primary attributable to the imaginary part of $H_{xy}$, which is quite sensitive to the bed boundaries. Nevertheless, the these $R_h$ & $R_v$ results are still accurate enough to be applied as initial guesses for 1D layered inversion to enhance 1D inversion speed, stability, and accuracy.

The foregoing equations provide a robust method for estimating dipping anisotropic formation parameters, with the potential advantage that only single-frequency measurements would be needed. While the calculations essentially assume a "zero-dimensional" or single-point model, the results are nonetheless accurate enough to be used for the initial formation model in a multidimensional inversion technique.

Numerous variations, modifications, and equivalents will become apparent to those of ordinary skill once the above disclosure is fully appreciated. The following claims should be interpreted to embrace all such variations, modifications, and equivalents.

What is claimed is:

1. A method for determining conductivity in a formation, wherein the method comprises:
   gathering, by a borehole logging tool, multi-component transmitter-receiver coupling measurements using a transmitter and at least one receiver spaced from the transmitter, wherein the transmitter comprises a triad of mutually orthogonal transmitters and the receiver comprises a triad of mutually orthogonal receivers with a triad of bucking coils;
   receiving multi-component transmitter-receiver coupling measurements including diagonal coupling measurements and cross-coupling measurements gathered by the borehole logging tool;
   obtaining, by a processor, from the cross-coupling measurements and not from the diagonal coupling measurements: a strike angle, an initial dip angle, an initial anisotropy factor, and an initial horizontal conductivity;
   determining, by the processor, from the cross-coupling measurements, the strike angle, the latest dip angle, and the latest anisotropy factor, and the latest conductivity: an iterative anisotropy factor, an iterative horizontal conductivity, and an iterative dip angle; and
   displaying a log based at least in part on at least one of said iterative values.

2. The method of claim 1, wherein the initial horizontal conductivity $\sigma_1$ corresponds to $$\sigma_1 = K_1 \frac{[(H_{xz})_X - (H_{xz})_R]}{(1 - A_1)} \frac{\tan\alpha_1}{\cos\beta},$$

wherein $(H_{zx})_X$ and $(H_{zx})_R$ are the imaginary and real parts, respectively, of the $H_{zx}$ cross-coupling measurement, $K_1$ is a tool constant, $A_1$ is the initial anisotropy factor corresponding to $$A_1 = \frac{1}{1 + \frac{(H_{xy})_X - (H_{xy})_R}{(H_{xz})_X - (H_{xz})_R} * \frac{\tan\alpha_1}{\sin\beta}},$$

wherein $(H_{xy})_X$ and $(H_{xy})_R$ are the imaginary and real parts, respectively, of the $H_{xy}$ cross-coupling measurement, $\alpha_1$ is the initial dip angle corresponding to $$\alpha_1 = \arctan\left[\sqrt{\left(\frac{(H_{xy})_R}{(H_{xz})_R}\right)^2 + \left(\frac{(H_{xy})_R}{(H_{yz})_R}\right)^2}\right],$$

wherein $(H_{zy})_R$ is the real parts of the $H_{zy}$ cross-coupling measurement, and wherein $\beta$ is the strike angle corresponding to $$\beta = \arctan\left(\frac{H^t_{yz}}{H^t_{xz}}\right).$$

3. The method of claim 1, wherein the iterative horizontal conductivity $\sigma_{i+1}$ corresponds to $$\sigma_{i+1} = K_1 \frac{[(H_{xz})_X - (H_{xz})_R]}{(1 - A_{i+1})} \frac{\tan\alpha_{i+1}}{\cos\beta},$$

wherein $(H_{zx})_X$ and $(H_{zx})_R$ are the imaginary and real parts, respectively, of the $H_{zx}$ cross-coupling measurement, $K_1$ is a tool constant, $A_{i+1}$ corresponds to $$A_{i+1} = \frac{1}{1 + \frac{(H_{xy})_X - (H_{xy})_R - \Gamma_{xy}}{(H_{xz})_X - (H_{xz})_R - \Gamma_{xz}} * \frac{\tan\alpha_i}{\sin\beta}},$$

wherein $(H_{xy})_X$ and $(H_{xy})_R$ are the imaginary and real parts, respectively, of the $H_{xy}$ cross-coupling measurement, $\Gamma_{xy}$ and $\Gamma_{zx}$ are iterative corrections, $\alpha_{i+1}$ corresponds to $$\alpha_{i+1} = \arctan\left[\sqrt{\left(\frac{(H_{xy})_R - \Lambda_{xy}}{(H_{xz})_R - \Lambda_{xz}}\right)^2 + \left(\frac{(H_{xy})_R - \Lambda_{xy}}{(H_{yz})_R - \Lambda_{yz}}\right)^2}\right],$$

wherein $(H_{zy})_R$ is the real parts of the $H_{zy}$ cross-coupling measurement, and $\Lambda_{xy}$, $\Lambda_{zx}$, and $\Lambda_{zy}$ are iterative correction terms, and wherein $\beta$ is the strike angle corresponding to $$\beta = \arctan\left(\frac{H^t_{yz}}{H^t_{xz}}\right).$$

4. The method of claim 3, wherein the iterative correction $\Gamma_{zx}$ corresponds to $$\Gamma_{xz} = \frac{\cos\beta\sin2\alpha_i}{\sin^2\alpha_i}\left[\begin{array}{l}-\frac{2}{3}(1-A_i^3)\left\{K_2\left(\frac{L_M}{\delta_i}\right)^4 + K_3\left(\frac{L_B}{\delta_i}\right)^4\right\} + \\ \frac{1}{3}(1-A_i^4)\left\{K_2\left(\frac{L_M}{\delta_i}\right)^5 + K_3\left(\frac{L_B}{\delta_i}\right)^5\right\}\end{array}\right]$$

and the iterative correction $\Gamma_{xy}$ corresponds to $$\Gamma_{xy} = \frac{\sin2\beta}{\sin^2\alpha_i}\left[\begin{array}{l}-T_1\left\{K_2\left(\frac{L_M}{\delta_i}\right)^4 + K_3\left(\frac{L_B}{\delta_i}\right)^4\right\} - \\ 2T_2\left\{K_2\left(\frac{L_M}{\delta_i}\right)^5 + K_3\left(\frac{L_B}{\delta_i}\right)^5\right\}\end{array}\right], \text{ with}$$

$$T_1 = \frac{2}{3}(\cos^2\alpha_i + 1)(A_i^3 - 1) - 2A_i(A_i^2 - \cos^2\alpha_i) + 2\sin^2\alpha_i$$

$$T_2 = -\frac{1}{6}(\cos^2\alpha_i + 1)(A_i^4 - 1) + \frac{2}{3}A_i^2(A_i^2 - \cos^2\alpha_i) - \frac{2}{3}\sin^2\alpha_i$$

wherein $\beta$ is the strike angle, $\alpha_i$ is the latest dip angle, $A_i$ is the latest anistropy factor, $K_2$ and $K_3$ are tool constants, $L_M$ and $L_B$ are distances between the transmitter and the receiver's main coils and bucking coils, respectively, and $\delta_i = \sqrt{2/\omega\mu\sigma_i}$ is the latest skin depth, with $\sigma_i$ being the latest conductivity.

5. The method of claim 3, wherein the iterative correction term $\Lambda_{zx}$ corresponds to $$\Lambda_{zx} = \frac{\cos\beta\sin2\alpha_i}{\sin^2\alpha_i}\left[\begin{array}{l}\frac{2}{3}(1-A_{i+1}^3)\left(K_2\left(\frac{L_M}{\delta_{i+1}}\right)^4 + K_3\left(\frac{L_B}{\delta_{i+1}}\right)^4\right) - \\ \frac{1}{6}(1-A_{i+1}^4)\left(K_2\left(\frac{L_M}{\delta_{i+1}}\right)^5 + K_3\left(\frac{L_B}{\delta_{i+1}}\right)^5\right)\end{array}\right]$$

the iterative correction term $\Lambda_{zy}$ corresponds to $$\Lambda_{zy} = \frac{\sin\beta\sin2\alpha_i}{\sin^2\alpha_i}\left[\begin{array}{l}\frac{2}{3}(1-A_{i+1}^3)\left(K_2\left(\frac{L_M}{\delta_{i+1}}\right)^4 + K_3\left(\frac{L_B}{\delta_{i+1}}\right)^4\right) - \\ \frac{1}{6}(1-A_{i+1}^4)\left(K_2\left(\frac{L_M}{\delta_{i+1}}\right)^5 + K_3\left(\frac{L_B}{\delta_{i+1}}\right)^5\right)\end{array}\right]$$

and the iterative correction term $\Lambda_{xy}$ corresponds to $$\Lambda_{xy} = \frac{\sin2\beta}{\sin^2\alpha_i}\left[\begin{array}{l}T_1\left(K_2\left(\frac{L_M}{\delta_{i+1}}\right)^4 + K_3\left(\frac{L_B}{\delta_{i+1}}\right)^4\right) + \\ T_2\left(K_2\left(\frac{L_M}{\delta_{i+1}}\right)^5 + K_3\left(\frac{L_B}{\delta_{i+1}}\right)^5\right)\end{array}\right], \text{ with}$$

$$T_1 = \frac{2}{3}(\cos^2\alpha_i + 1)(A_{i+1}^3 - 1) - 2A_{i+1}(A_{i+1}^2 - \cos^2\alpha_i) + 2\sin^2\alpha_i$$

$$T_2 = -\frac{1}{6}(\cos^2\alpha_i + 1)(A_{i+1}^4 - 1) + \frac{2}{3}A_{i+1}^2(A_{i+1}^2 - \cos^2\alpha_i) - \frac{2}{3}\sin^2\alpha_i$$

wherein is the strike angle, $\alpha_i$ is the latest dip angle, $A_{i+1}$ is the latest anistropy factor, $K_2$ and $K_3$ are tool constants, $L_M$ and $L_B$ are distances between the transmitter and the receiver's main coils and bucking coils, respectively, and $\delta_i = \sqrt{2/\omega\mu\sigma_i}$ is the latest skin depth, with $\sigma_i$ being the latest conductively.

6. A logging method that comprises:
conveying a logging tool along a borehole through a formation, wherein the logging tool comprises:
a transmitter, wherein the transmitter further comprises a triad of mutually orthogonal transmitters; and
at least one receiver spaced from the transmitter, wherein the at least one receiver comprises a triad of mutually orthogonal receivers with a triad of bucking;

inducing an electromagnetic field into a formation;
measuring an in-phase and quadrature phase voltage signal induced in each of the at least one receiver coils by the transmitter;
producing a multicomponent measurement from the recording the voltage with the at least one receiver;
producing a diagonal coupling measurement from the multicomponent measurement;
producing a cross-coupling measurement form the multicomponent measurement;
obtaining, by a processor, from the cross-coupling measurements and not from the diagonal coupling measurements: a strike angle, an initial dip angle, an initial anisotropy factor, and an initial conductivity;
determining, by the processor, from the cross-coupling measurements, the strike angle, the latest dip angle, and the latest anisotropy factor, and the latest conductivity: an iterative anisotropy factor, an iterative conductivity, and an iterative dip angle; and
displaying a log based at least in part on at least one of said iterative values.

7. The method of claim 6, further comprising:
repeating said determining of said iterative anisotropy factor, iterative conductivity, and iterative dip angle.

8. The method of claim 7, wherein said repeating is performed a number of times that minimizes an overall residual error.

\* \* \* \* \*